US010176085B2

(12) United States Patent
Zare et al.

(10) Patent No.: US 10,176,085 B2
(45) Date of Patent: Jan. 8, 2019

(54) METHOD AND SYSTEM FOR GENERATING FUNCTIONAL TEST CASES FOR SOFTWARE SYSTEMS

(71) Applicant: Tata Consultancy Services Limited, Mumbai (IN)

(72) Inventors: Amey Anand Zare, Pune (IN); Venkatesh R, Pune (IN); Ulka Aniruddha Shrotri, Pune (IN); Supriya Agrawal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 296 days.

(21) Appl. No.: 15/189,761

(22) Filed: Jun. 22, 2016

(65) Prior Publication Data

US 2016/0378646 A1 Dec. 29, 2016

(30) Foreign Application Priority Data

Jun. 24, 2015 (IN) .......................... 2412/MUM/2015

(51) Int. Cl.
*G06F 9/44* (2018.01)
*G06F 11/36* (2006.01)
(52) U.S. Cl.
CPC ...... *G06F 11/3684* (2013.01); *G06F 11/3688* (2013.01); *G06F 11/3692* (2013.01)
(58) Field of Classification Search
CPC .................................................. G06F 11/3684
USPC ........................................................ 717/124
See application file for complete search history.

(56) References Cited

U.S. PATENT DOCUMENTS

| 6,002,869 | A | * | 12/1999 | Hinckley | ............ | G06F 11/3696 |
| | | | | | | 714/35 |
| 7,739,550 | B2 | * | 6/2010 | Yamamoto | .......... | G06F 11/3672 |
| | | | | | | 714/38.12 |
| 8,473,913 | B2 | | 6/2013 | Noller et al. | | |
| 8,683,446 | B2 | | 3/2014 | Paradkar et al. | | |

(Continued)

OTHER PUBLICATIONS

Venkatesh, R. et al. "EDT: A Specification Notation for Reactive Systems," *2014 Design, Automation & Test in Europe Conference & Exhibition,* Mar. 24-28, 2014, pp. 1-6.

(Continued)

*Primary Examiner* — Evral E Bodden
(74) *Attorney, Agent, or Firm* — Finnegan, Henderson, Farabow, Garrett & Dunner LLP

(57) ABSTRACT

A method and system is provided for automated generation of the functional test cases for testing a software system. In an embodiment, the invention provides an expressive decision table (EDT), a requirement specification notation designed to reduce translation efforts. It implements a novel scalable row-guided random algorithm with fuzzing (RGRaF) (pronounced R-graph) to generate test cases. The invention also implements two new coverage criteria targeted at requirements and requirement interactions. The invention also provides fuzzing at time boundaries to achieve scalability. According to an embodiment, the invention also provides the feature of generating error in case the generated functional test case corresponds to system property violation of the software system. According to another embodiment, the system can also reject the functional test case if there is an improbable condition of the software system.

12 Claims, 6 Drawing Sheets

(56) References Cited

U.S. PATENT DOCUMENTS

| | | | |
|---|---|---|---|
| 8,849,975 B2* | 9/2014 | Brayman | G06F 11/3419 |
| | | | 709/222 |
| 8,869,111 B2 | 10/2014 | Gorthi et al. | |
| 9,015,667 B2* | 4/2015 | Meijer | G06F 11/076 |
| | | | 717/124 |
| 9,262,307 B2* | 2/2016 | Segall | G06F 11/3676 |
| 9,589,232 B2* | 3/2017 | Gould | G06F 8/10 |
| 2003/0191774 A1* | 10/2003 | Slutz | G06F 11/3672 |
| 2004/0255275 A1 | 12/2004 | Czernonka | |
| 2007/0094189 A1* | 4/2007 | Yamamoto | G06F 11/3684 |
| | | | 706/45 |
| 2015/0033208 A1 | 1/2015 | Krishna et al. | |

OTHER PUBLICATIONS

Pan, F. et al. (Mar. 2013). "Efficient Model-based Fuzz Testing Using Higher-order Attribute Grammars," *Journal of Software*, vol. 8, No. 3, pp. 645-651.

\* cited by examiner

| sno | in Ignition | in Alarm | in PanicSw | out Alarm | out Flash |
|---|---|---|---|---|---|
| 1 | Off | Off | {(Press,Release)[t=2]}{t<3s} | On{=30s};Off | {On{=500ms},Off{=500ms}}{t=30};No_Req |
| 2 | | On | Press{>3s};Release | Off | No_Req |
| 3 | On | | | Off | No_Req |

TABLE 1: EDT for Alarm feature

FIG. 3a

| Time(ms) | Input Signals | Remarks |
|---|---|---|
| 0 | PanicSw=Press | |
| 500 | PanicSw=Release | |
| 1000 | PanicSw=Press | |
| 1500 | PanicSw=Release | Row 1 output starts |
| 2000 | PanicSw=Press | |
| 5500 | PanicSw=Release | Row 2 output starts |

TABLE II: Test Case for Row and I/O row-interaction coverage

FIG. 3b

| Time(ms) | Input Signals | Remarks |
|---|---|---|
| 0 | PanicSw=Press | |
| 500 | PanicSw=Release | |
| 1000 | PanicSw=Press | |
| 1500 | PanicSw=Release | Row 1 output starts |
| 2000 | Ignition=On | Row 3 output starts |

TABLE III: Test Case for O/O row-interaction coverage

FIG. 3c

METHOD AND SYSTEM FOR GENERATING FUNCTIONAL TEST CASES FOR SOFTWARE SYSTEMS

CROSS-REFERENCE TO RELATED APPLICATION AND PRIORITY

The present application claims priority from Indian provisional specification no. 2412/MUM/2015 filed on 24 Jun. 2015, the complete disclosure of which, in its entirety is herein incorporated by references.

TECHNICAL FIELD

The present application generally relates to software testing. More particularly, but not specifically, the invention provides a method and system for generating functional test cases for a software system.

BACKGROUND

A software is an integral part of computer applications, due to which the development of a hug-free software is biggest challenge for a software developing community. The important part of the software development is the functional test case generation for software testing. The functional test case generation is an intellectually demanding and critical task that has a strong impact on the effectiveness and efficiency of the entire software testing process. These software are commonly used in a software system. For the large and complex software system, it is difficult even for the domain experts to envision all interactions between requirements. This sometimes makes it impossible to write functional test cases that cover all requirements and the interactions among them. Thus, there is a need of developing a method for automatically generating functional test case for software testing.

Various methods have been used for automatically generating the test cases, Random Test case Generation (RTG) and Model-Based Testing (MBT) are two techniques that are used for functional test case generation for the software system, RTG method generates random test cases and does not generate expected results. RTG requires a lot of additional effort to determine results and it is very likely that it generate a large number of redundant functional test cases.

On the other hand, MBT is implemented by several tools, but it is not widely adopted by the software developers as the requirements need to be specified in a formal language supported by the tool. Often, the language supported by these tools demands a strong mathematical background from the developer or require the developer to design the state space of the problem even if it is not part of the requirements. This activity is effort-intensive and adversely affects the overall cost of the approach. In fact, very little is known about the cost-effectiveness of MBT. Moreover, the syntactic structure of these languages is very different from the original requirements description, so there is no direct mapping from specifications to requirements. As a result, the coverage targeted by these tools, such as state and transition coverage, does not directly map to the requirements. MBT tools use a combination of random generation and constraint solving to generate test cases, however, neither of these techniques scale-up to industry-size applications.

The existing methods are effort intensive as they either require a specification in a formal language or they need expected results to be determined. Additionally, the existing methods are not applicable to industry size applications.

SUMMARY

Embodiments of the present disclosure present technological improvements as solutions to one or more of the above-mentioned technical problems recognized by the inventors in conventional systems.

The present application provides a processor implemented method for generating functional test cases for testing a software system. The requirements of the software system are converted to expression decision table (EDT) specifications. These EDT specifications are provided as input parameter to the system. Automata is constructed using an automata builder. Each of the automaton out of the automata corresponds to each of the cells in a plurality of rows present in the EDT specifications. In the next step, an input sequence is generated by selecting a random sequence of rows from the EDT specifications using an input sequence generation module. The input sequence is then passed to an expected output generation module. The expected output generation module executes the automaton and determines the rows out of the plurality of rows that matches the input sequence to generate an expected output sequence. It also performs fuzzing so as to cover complex time-based requirements. In the last step, a final output generation module generates the functional test cases if a predefined set of conditions are satisfied. The predefined set of conditions comprises at least one of a row or a row-interaction is covered by the functional test cases and the functional test cases do not involve an invalid test scenario. According to another embodiment of the invention, the system is also configured to achieve scalability and coverage of the functional test case generation using fuzzing at time boundaries.

In another embodiment, a non-transitory computer-readable medium having embodied thereon a computer program for generating functional test cases for testing a software system. The requirements of the software system are converted to expression decision table (EDT) specifications. These EDT specifications are provided as input parameter to the system. Automata is constructed using an automata builder. Each of the automaton out of the automata corresponds to each of the cells in a plurality of rows present in the EDT specifications. In the next step, an input sequence is generated by selecting a random sequence of rows from the EDT specifications using an input sequence generation module. The input sequence is then passed to an expected output generation module. The expected output generation module executes the automaton and determines the rows out of the plurality of rows that matches the input sequence to generate an expected output sequence. It also performs fuzzing so as to cover complex time-based requirements. In the last step, a final output generation module generates the functional test cases if a predefined set of conditions are satisfied. The predefined set of conditions comprises at least one of a row or a row-interaction is covered by the functional test cases and the functional test cases do not involve an invalid test scenario. According to another embodiment of the invention, the system is also configured to achieve scalability and coverage of the functional test case generation using fuzzing at time boundaries.

It is to be understood that both the foregoing general description and the following detailed description are exemplary and explanatory only and are not restrictive of the invention, as claimed.

BRIEF DESCRIPTION OF DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings:

FIG. 3a shows a table illustrating an example of EDT specification used for functional test case generation in accordance with an embodiment of the invention;

FIG. 3b shows another table illustrating the example of functional test case in accordance with an embodiment of the invention; and FIG. 3c shows yet another table illustrating the example of another functional test case in accordance with an embodiment of the invention.

Figure 1:
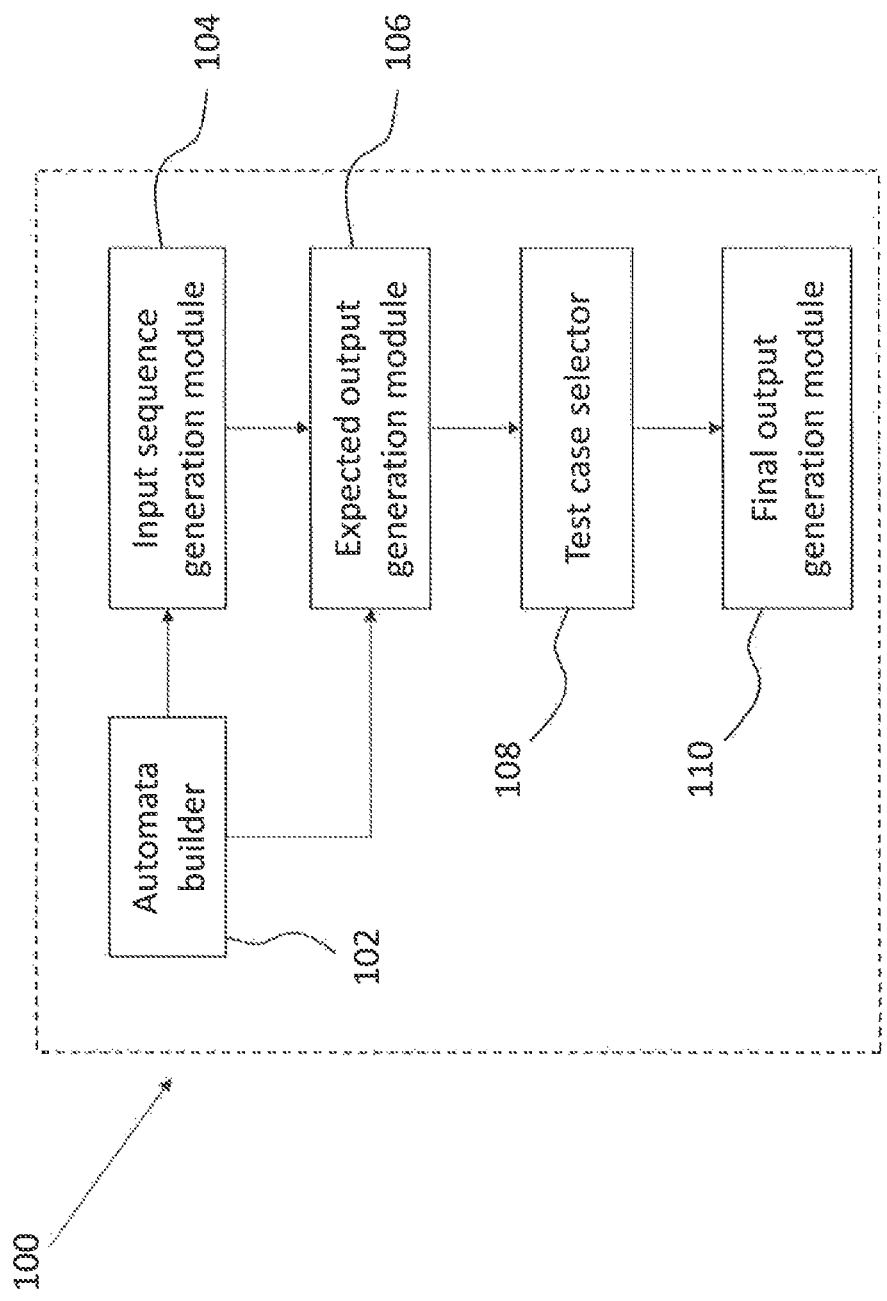
FIG. 1 shows a block diagram illustrating architecture of a system for generating functional test cases for testing a software system in accordance with an embodiment of the invention.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present application provides a processor implemented method for generating functional test cases for testing a software system. The requirements of the software system are converted to expression decision table (EDT) specifications. These EDT specifications are provided as input parameter to the software system. Automata is constructed using an automata builder. Each of the automaton out of the automata corresponds to each of the cells in a plurality of rows present in the EDT specifications. In the next step, an input sequence is generated by selecting a random sequence of rows from the EDT specifications using an input sequence generation module. The input sequence is then passed to an expected output generation module. The expected output generation module executes the automaton and determines the rows out of the plurality of rows that matches the input sequence to generate an expected output sequence. It also performs fuzzing so as to cover complex time-based requirements. In the last step, a final output generation module generates the functional test cases if a predefined set of conditions are satisfied. The predefined set of conditions comprises at least one of a row or a row-interaction is covered by the functional test cases and the functional test cases do not involve an invalid test scenario. According to another embodiment of the invention, the system is also configured to achieve scalability and coverage of the functional test case generation using fuzzing at time boundaries.

According to an embodiment of the present invention, a system 100 for automatically generating functional test cases for testing a software system is shown in FIG. 1. The software system is a system of intercommunicating components based on software forming part of a computer system (a combination of hardware and software). It should be appreciated that the software system may also include a reactive system. The reactive system is the system that responds to external events. A functional test case comprises a timed sequence of input values and corresponding expected output values. The software system has a set of requirement which needs to be fulfilled. The system 100 utilizes a requirement-driven method to generate functional test cases.

The system 100 provides expression decision table (EDT) based testing (EBT) to reduce the test case generation efforts. EBT provides an approach that combines row-guided random input generation with fuzzing at time boundaries (RGRaF) to scale up functional test case generation. The RGRaF method have been implemented in a tool called EDT-Test, which is performed on the system 100. The EDT specifications are provided as an input to the system 100. The EDT specification specifies the functional requirement of the software system under test. The EDT includes a plurality of rows having multiple number of cells. In the EDT specifications, each of the cells in the plurality of rows map directly to the requirements that are described in the natural language. The EDT specifications provide a uniform notation to specify both state-based and sequence-based requirements, leading to compact specifications of the software systems. The EDT specifications consists of one or more table(s) where the column headers specify the input and output signal names, and the rows specify relationships between patterns of input and output signal values or events. An exemplary example of the EDT specification has been explained in the later part of this disclosure.

The system 100 includes an automata builder 102 constructing automata, an input sequence generation module 104, an expected output generation module 106, a test case selector 108 and a final output generation module 110. The EDT specifications are provided as an input parameter to the system 100. Each of the automaton out of the automata corresponds to each of the cells in the plurality of rows present in the EDT specifications. The automata are discrete timed automata. The input sequence generation module 104 is configured to generate an input sequence. The input sequence is a set of random sequence of rows randomly selected from the rows of the EDT specifications, including uncovered rows with a higher probability. In an embodiment of the invention, the input sequence generation module 104 generally gives priority to unmatched rows out of the plurality of rows of the EDT specifications.

The input sequence from the input sequence generation module 104 is then sent as an input to the expected output generation module 106. The expected output generation module 106 is configured to execute the automaton corresponding to each EDT cell and determine the rows that matches the input sequence to generate an expected output sequence. The system 100 is also configured to merge the expected output sequence generated by the matched row. The final output generation module 110 receives the expected output sequence from the expected output generation module 106. In an embodiment of the invention, the test case selector 108 is configured to forward the expected output sequence to the final output generation module 110 if a predefined set of conditions are satisfied.

The predefined set of conditions comprises that the functional test cases are covering at least one of a row or a row-interaction and the functional test cases do not involve an invalid test scenario. According to an embodiment of the invention, the system 100 provides row and row interaction coverage criteria. The row coverage is configured to measure the coverage of requirements. The row-interaction coverage is configured to measure the coverage of the interactions between the requirements.

According to an embodiment of the invention, the system 100 is configured to achieve scalability and coverage of the functional test case generation using fuzzing at time boundaries. At the end of each functional test case generation, the time of inputs occurring around the nearest time is changed randomly, at which a time-out may occur. It should be appreciated that the fuzzing can be performed at any time during the test case generation to achieve scalability. The generated scenario is altered by randomly changing the time of some inputs that occur either—a) before a first time period T to a time after it or b) after the first time period T to a time before it.

According to another embodiment of the invention, the system 100 is also configured to reject the functional test cases which generate improbable conditions which cannot happen in the functioning of real-world software system. In the software systems, there could be several combination(s) of input(s) and output(s) that can never occur in the actual run of the software system. The system 100 compares the functional test case with a set of input sequence corresponding to a reject flag. If the functional test case matches with the input sequence with reject flag then the functional test case will not be output by the final output generation module 110.

According to another embodiment of the invention, the system 100 is also configured to generate an error flag. Generally, the requirements of the real-world software systems contain certain safety-critical requirements that should never be violated during the execution of the software systems. These are the properties of the software systems. The system 100 compares the functional test case with a set of input sequence corresponding to the error condition. If the functional test case match with the input sequence with the error condition then the system 100 will generate the error flag. The error flag refers to a system property violation of the software system.

Figure 2:
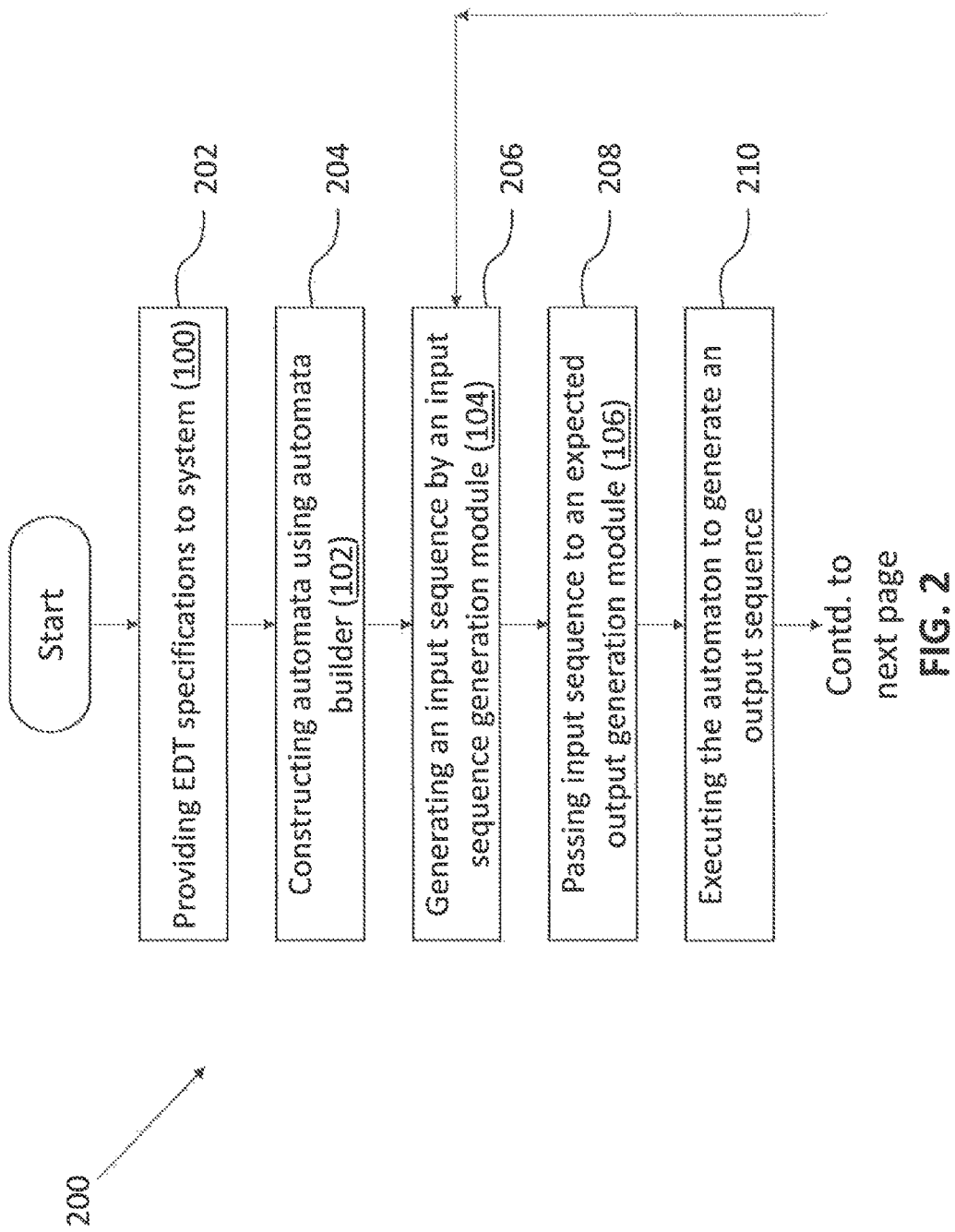
FIG. 2 shows a flow chart illustrating steps involved in the generation of the functional test cases in accordance with an embodiment of the invention.
Figure 2:
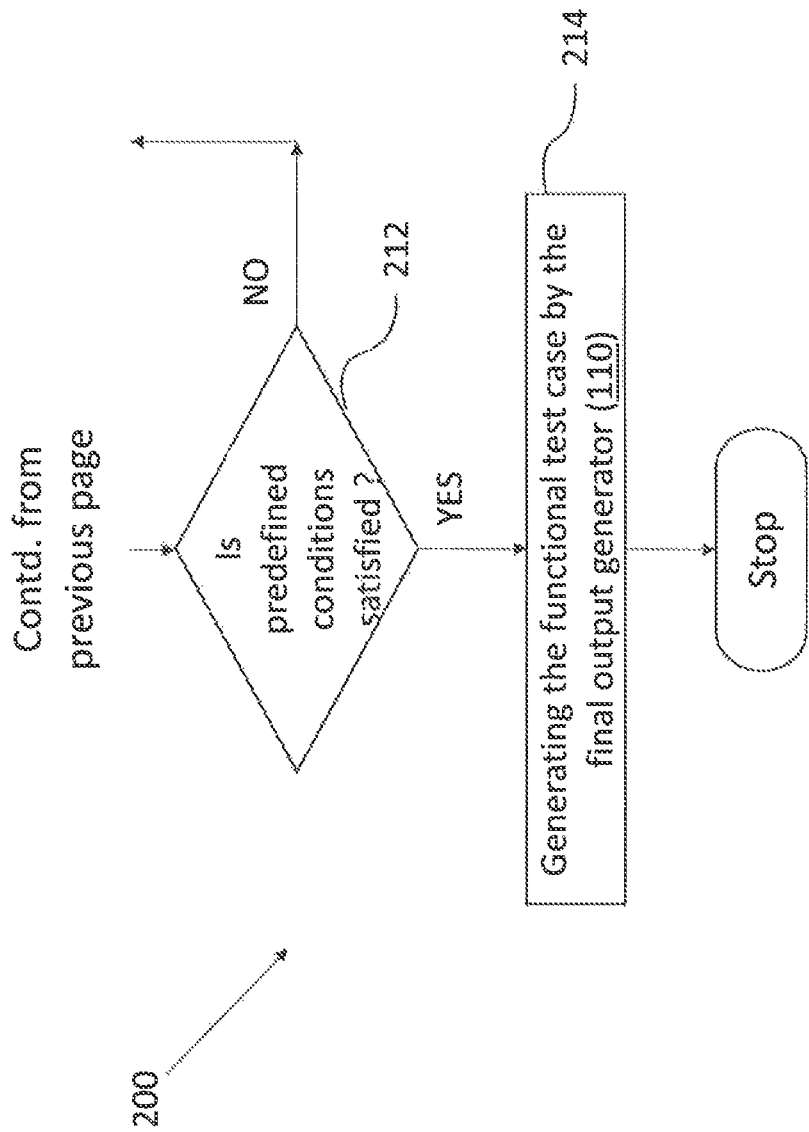

A flow chart 200 illustrating the steps involved in the generation of the functional test cases for testing the software system is shown in FIG. 2 in accordance with an embodiment of the invention. Initially at step 202, EDT specifications are provided as input parameters to the system 100. EDT specifications have a plurality of rows having multiple cells. Each of the cells of the EDT specifications map to the requirements of the software system. At the next step 204, the automata is constructed by the automata builder 102. Each of the automaton out of the automata corresponds to each of the cells in the plurality of rows present in the EDT specifications. At next step 206, the input sequence is generated by selecting a random sequence of rows from the EDT specifications using the input sequence generation module 104.

At step 208, the input sequence is passed to the expected output generation module 106. In the next step 210, the automaton corresponding to each EDT cell is executed by the expected output generation module 106 and matching rows out of the plurality of rows with the input sequence are determined to generate the expected output sequence. It also performs fuzzing to cover rows that contain complex time-based requirements. At the next step 212, it is checked that whether the predefined set of conditions are satisfied. The predefined set of condition comprises that the functional test cases are covering at least one of a row or a row-interaction and the functional test cases do not involve an invalid test scenario. If conditions are not satisfied, then once again input sequence is generated by the input sequence generation module 104 according to the step 206. If conditions are satisfied, then the functional test cases are generated by the final output generator 110.

The method of generating functional test cases for the software system is explained with the help of the following exemplary example involving the partial requirements of the alarm module of a real world automotive application. The example includes three conditions as shown in the table of FIG. 3a. 1) If Ignition and Alarm are Off, and PanicSw is pressed and released twice within 3 seconds, then Alarm should be On for 30 seconds, and Flash should blink 30 times with a gap of 500 milliseconds between each On and Off and should have No Req after that. 2) If Alarm is On and PanicSw is pressed for more than 3 seconds and then released (called as long press), then the Flash should be No Req and Alarm should be Off. 3) If Ignition becomes On, then Flash should be No Req and Alarm should be Off.

In this example each row maps directly to one of the requirements. The column headers specify three input signals: Ignition, PanicSw and Alarm, and two output signals: Flash and Alarm. It should be noted that Alarm is an input and output (I/O) signal. The pattern expressions in each input cell specify the sequence of input value(s) that will match the requirements of that cell. The pattern expressions in an output cell specify the sequence of signal value(s) that will be output when the requirements of all the input cells in that row are matched. The pattern language itself is regular, as EDT supports a discrete timed model, and can be recognized by a discrete timed automaton. The pattern Off given in the first row for columns corresponding to the signals Ignition and Alarm matches when the environment sends the value Off for these signals to the system. The compactness of EDT is illustrated by the pattern '{{Press; Release}{=2}}{<3s}' which is detected when the values Press followed by Release are received twice within three seconds for the signal PanicSw. The output pattern '{On{=500 ms};Off{=500 ms}}{=30}; No_Req' corresponding to the signal Flash specifies that the values On followed by Off should be output with a gap of 500 milliseconds, and this pattern should be repeated 30 times and then Flash should become No_Req.

Further, the two coverage criteria—row coverage and row-interaction coverage can also be described with the help of this example. Table shown in FIG. 3b illustrates a test case corresponding to EDT specification shown in Table of FIG. 3a. The default values of input signals Ignition and Alarm are considered to be Off. When PanicSw values are generated as Press followed by Release twice within three seconds, that is at time 1500 milliseconds (ms) in Table of FIG. 3b, Row 1 is matched and hence the expected output of Alarm is On and the flashing pattern is 'On followed by Off'.

Similarly, row-interaction coverage have the following two types of interactions between them. 1. I/O row-interaction: $(r_1, r_2)$ is said to be an I/O row interaction if r1 outputs a value that is used by $r_2$. 2. O/O row-interaction: $(r_1, r_2)$ is said to be an O/O row interaction if both $r_1$ and $r_2$ output values for the same signal at the same time. Row-interaction is covered when a test case captures either of the aforementioned interactions between rows. In the example mentioned in Table of FIG. 3a, because of the common I/O signal Alarm, there are three I/O row-interactions: (1; 2); (2, 1) and (3; 1). This is because the output On to Alarm in Row 1 is used by Row 2 and the output Off to Alarm in Rows 2 and 3 is used by Row 1. The input sequence shown in the test case in Table of FIG. 3b covers the row-interaction (1; 2.). In Table of FIG. 3a, Rows 1 and 3 form an O/O row-interaction (1; 3) as both these rows can potentially affect the output value of the same signal Flash at the same time. Consider the input sequence shown in Table of FIG. 3c. At time 1500 ms, the output pattern for Flash will start because Row 1 is matched. However, at time 2000 ms the output of Flash is changed to No Req, although the previous output pattern is still going on. This happens because Row 3 is matched due to the occurrence of Ignition=On. When such input sequence is generated in a test case, it is said to have covered O/O row-interaction (1; 3).

In view of the foregoing, it will be appreciated that the present invention provides a method and system for the generation of functional test cases for a software system using a novel RGRaF approach. Still, it should be understood that the foregoing relates only to the exemplary embodiments of the present invention, and that numerous changes may be made thereto without departing from the spirit and scope of the invention as defined by the following claims.

What is claimed is:

1. A method for generating functional test cases for testing a software system, the method comprising a processor implemented steps of:
providing expressive decision table (EDT) specifications, wherein the EDT specifications specify requirements of the software system;
constructing automata using an automata builder (102), wherein the automata correspond to each of a plurality of cells in a plurality of rows present in the EDT specifications;
generating an input sequence by selecting a random sequence of rows from the EDT specifications using an input sequence generation module (104), wherein the input sequence generation further involves giving priority to unmatched rows out of the plurality of rows of the EDT specifications;
passing the input sequence to an expected output generation module (106), wherein the expected output generation module (106) executes each of the automaton out of the automata, corresponding to each of the cells of the EDT and determines the rows out of the plurality of rows that matches the input sequence to generate an expected output sequence; and
providing the expected output sequence to a final output generation module (110) to generate the functional test cases if a predefined set of conditions are satisfied, wherein the predefined set of conditions comprises,
at least one of a row or a row-interaction is covered by the functional test cases and the functional test cases do not involve an invalid test scenario.

2. The method of claim 1 further includes the step of fuzzing to cover complex time-based requirements of the software system by changing a time period at which the input sequence is generated.

3. The method of claim 1 further includes the step of rejecting the functional test case if the functional test case matches to a row in the input sequence corresponding to a reject flag, wherein the reject flag refers to an improbable condition of the software system.

4. The method of claim 1 further includes the step of generating an error by the final output generation module if the functional test case matches to a row in the input sequence corresponding to an error flag, wherein the error flag refers to a system property violation of the software system.

5. The method of claim 1, wherein the automata are discrete timed automata.

6. The method of claim 1 further includes the step of merging the expected output sequence generated by the matched rows out of the plurality of rows.

7. The method of claim 1, wherein the EDT specifications comprising one or more tables having at least one input parameter and at least one output parameter and the rows of the EDT specifications specifying the relationship between the input parameter and the output parameter.

8. The method of claim 1, wherein the plurality of rows are mapping to the requirement of the software system.

9. A system for generating functional test cases for testing a software system, the system comprising a processor and:
   an automata builder (102) constructing automata, the automata correspond to each of the cells in a plurality of rows present in EDT specifications, wherein the EDT specifications are specifying the requirements of the system;
   an input sequence generation module (104) generating an input sequence by selecting a random sequence of rows from the EDT specifications, wherein the input sequence generation further involves giving priority to unmatched rows out of the plurality of rows of the EDT specifications;
   an expected output generation module (106) receiving the input sequence from the input sequence generation module, wherein the expected output generation module executes each of the automaton out of the automata, corresponding to each of the cells of the EDT and determines the rows that match the input sequence to generate an output sequence;
   a final output generation module (110) configured to receive the output sequence and generate the functional test cases if a predefined set of conditions are satisfied, wherein the predefined set of conditions comprises:
   at least one of a row or a row-interaction is covered by the functional test cases and the functional test cases do not involve an invalid test scenario.

10. The system of claim 9 further includes a test case selector (108) configured to forward the output sequence to the final output generation module if the predefined set of conditions are satisfied.

11. The system of claim 9, wherein the automata are discrete timed automata.

12. A non-transitory computer-readable medium having embodied thereon a computer program for generating functional test cases for testing a software system, the method comprising:
   providing expressive decision table (EDT) specifications, wherein the EDT specifications specify requirements of the software system;
   constructing automata using an automata builder (102), wherein the automata correspond to each of a plurality of cells in a plurality of rows present in the EDT specifications;
   generating an input sequence by selecting a random sequence of rows from the EDT specifications using an input sequence generation module (104), wherein the input sequence generation further involves giving priority to unmatched rows out of the plurality of rows of the EDT specifications;
   passing the input sequence to an expected output generation module (106), wherein the expected output generation module (106) executes each of the automaton out of the automata, corresponding to each of the cells of the EDT and determines the rows out of the plurality of rows that matches the input sequence to generate an expected output sequence; and
   providing the expected output sequence to a final output generation module (110) to generate the functional test cases if a predefined set of conditions are satisfied, wherein the predefined set of conditions comprises,
   at least one of a row or a row-interaction is covered by the functional test cases and the functional test cases do not involve an invalid test scenario.

* * * * *